(12) United States Patent
Choi et al.

(10) Patent No.: US 9,354,127 B2
(45) Date of Patent: May 31, 2016

(54) DEVICE FOR MEASURING TEMPERATURE DISTRIBUTION OF FUEL CELL

(75) Inventors: Woonyong Choi, Daejeon (KR); Jonghoon Park, Daejeon (KR); Junghwan Kim, Daejeon (KR); Yunsung Kim, Daejeon (KR); Ingap Jang, Daejeon (KR); Taewon Lee, Daejeon (KR); Kilho Moon, Daejeon (KR)

(73) Assignee: DOOSAN HEAVY INDUSTRIES & CONSTRUCTION CO., LTD., Changwon-Si (KR)

( * ) Notice: Subject to any disclaimer, the term of this patent is extended or adjusted under 35 U.S.C. 154(b) by 330 days.

(21) Appl. No.: 13/993,913

(22) PCT Filed: Dec. 12, 2011

(86) PCT No.: PCT/KR2011/009538
§ 371 (c)(1),
(2), (4) Date: Jun. 13, 2013

(87) PCT Pub. No.: WO2012/081872
PCT Pub. Date: Jun. 21, 2012

(65) Prior Publication Data
US 2013/0279536 A1 Oct. 24, 2013

(30) Foreign Application Priority Data
Dec. 13, 2010 (KR) .................. 10-2010-0126658

(51) Int. Cl.
*G01K 3/00* (2006.01)
*G01K 13/00* (2006.01)
*G01K 1/10* (2006.01)
*G10K 7/02* (2006.01)
*H01M 8/04* (2016.01)

(52) U.S. Cl.
CPC ........ *G01K 13/00* (2013.01); *G01K 1/10* (2013.01); *G10K 7/02* (2013.01); *H01M 8/04007* (2013.01); *Y02E 60/50* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,536,950 | B1 * | 3/2003 | Green et al. ................ | 374/179 |
| 7,465,086 | B1 * | 12/2008 | Foreman, Jr. ............... | 374/143 |
| 7,771,116 | B2 * | 8/2010 | Bowen ........................ | 374/179 |
| 2007/0160427 | A1 * | 7/2007 | Allaire et al. ............... | 405/263 |
| 2010/0163750 | A1 * | 7/2010 | Hunwick et al. ............ | 250/474.1 |

FOREIGN PATENT DOCUMENTS

| | | | |
|---|---|---|---|
| JP | 2002-357482 A | 12/2002 | |
| JP | 2007-317552 A | 12/2007 | |

(Continued)

OTHER PUBLICATIONS

Notice of Allowance for KR 10-2010-0126658 dated Apr. 23, 2013.

(Continued)

*Primary Examiner* — Lisa Caputo
*Assistant Examiner* — Nasir U Ahmed
(74) *Attorney, Agent, or Firm* — Sughrue Mion, PLLC

(57) ABSTRACT

Disclosed is a device for measuring a temperature distribution of a fuel cell includes: a base member formed to come into contact with at least a portion of a fuel cell and having at least one accommodating portion; a heat transfer tube accommodated in the accommodating portion; and a thermocouple inserted into a hollow of the heat transfer tube and measuring a temperature of heat transmitted through the heat transfer tube.

10 Claims, 2 Drawing Sheets

(56) References Cited

FOREIGN PATENT DOCUMENTS

| JP | 2009-19991 A | 1/2009 |
| JP | 2010-21096 A | 1/2010 |

OTHER PUBLICATIONS

Office Action for KR 10-2010-0126658 dated Jun. 21, 2012.
International Search Report for PCT/KR2011/009538 dated Jul. 23, 2012.

* cited by examiner

DEVICE FOR MEASURING TEMPERATURE DISTRIBUTION OF FUEL CELL

TECHNICAL FIELD

The present disclosure relates to a device for measuring a temperature distribution capable of a temperature distribution of a particular portion of a fuel cell.

BACKGROUND ART

In operating a fuel cell, generally, a temperature distribution is very critical design factor. In particular, a planar temperature distribution of an electrode is an important factor considered in determining a configuration of a gas flow channel, a composition of a supply gas, a flow rate, a position of a catalyst, a shape of a separator, and the like, in designing a fuel cell.

Conventionally, in order to measure a planar temperature distribution of a fuel cell electrode, a thermocouple made of a metal is directly attached to a certain portion of the fuel cell or inserted between the electrode and the separator.

However, in the related art measurement method, since the thermocouple is directly connected to a measurement spot (or portion) of a fuel cell, increasing a possibility of damaging the fuel cell and the thermocouple. Also, since the thermocouple made of a metal is used, electricity generated in the fuel cell may be leaked to outside through the thermocouple or electricity flows to a different electrode.

The leakage of electricity and/or electrical conduction o a different electrode causes many problems such as a degradation of performance, a reduction in lifespan, a safety accident, a system stop, and the like, of the fuel cell, In addition, in terms of the characteristics of a fuel cell formed by stacking a plurality of electrodes, it is structurally difficult to measure a planar temperature distribution of a particular electrode. For example, in case of a molten carbonate fuel cell as a high temperature fuel cell, a thermocouple made of a metal is inserted into a portion of a separator to measure a temperature of an electrode. This measurement method, however, may cause leakage of electricity generated by the fuel cell through the thermocouple, and since the thermocouple made of a metal is exposed to electrolyte that corrodes the thermocouple, when the fuel cell is operated for 10,000 hours, the thermocouple is entirely short-circuited, and thus, it cannot be used any longer.

DISCLOSURE

Technical Problem

Therefore, an aspect of the detailed description is to provide a device for measuring a temperature distribution of a fuel cell capable of securing a desired life time and performance of a fuel cell.

Another aspect of the detailed description is to provide a device for measuring a temperature distribution of a fuel cell capable of measuring a planar temperature distribution in a portion or a spot of a particular electrode within a fuel cell configured by stacking a plurality of electrodes.

Technical Solution

To achieve these and other advantages and in accordance with the purpose of this specification, as embodied and broadly described herein, a device for measuring a temperature distribution of a fuel cell, including: a base member formed to come into contact with at least a portion of a fuel cell and having at least one accommodating portion; a heat transfer tube accommodated in the accommodating portion; and a thermocouple inserted into a hollow of the heat transfer tube and measuring a temperature of heat transmitted through the heat transfer tube.

According to an embodiment related to the present invention, the base member may be configured as a flat plate, and the accommodating portion may be formed to be recessed from one surface of the flat plate. The accommodating portion may be a groove formed on one surface of the flat plate. The flat plate may be made of stainless steel, and the heat transfer tube may be made of ceramic.

According to another embodiment related to the present invention, the accommodating portion may include a plurality of groove groups configured to include a plurality of grooves as a basic unit, respectively. Start portions of the plurality of grooves of the respective groove groups may be disposed in the same line in one direction with respect to the flat plate, and end portions thereof may be disposed in different positions in the other direction. The respective start portions of the plurality of grooves may be disposed to be spaced apart from one another along one side of the base member.

According to another embodiment related to the present invention, the respective groove groups may include five grooves. The five grooves may include a first groove positioned in the center and having a relatively short length, second and third grooves formed in both sides of the first groove and having a length greater than that of the first groove and having different lengths, and fourth and fifth grooves formed in both sides of the second and third grooves, having a length greater than those of the second and third grooves and having different lengths. The second and third grooves and the fourth and fifth grooves may be disposed to be sloped at certain angles toward each other.

Advantageous Effects

According to an embodiment of the present invention, the measurement device that does not damage the thermocouple and a fuel cell when the thermocouple is inserted into the fuel cell can be implemented through the combination of the thermocouple, the heat transfer tube, and the base member. Also, since the heat transfer tube is made of a ceramic material, the possibility of the corrosion of the thermocouple is mitigated or eliminated.

Also, the fuel cell and the thermocouple are electrically and chemically insulated but heat can be detected, a planar temperature distribution at a portion or spot of a particular electrode within the fuel cell can be measured, and desired life time and performance of the fuel cell can be secured.

In addition, since the device for measuring a temperature distribution of a fuel cell configured as a flat plate is provided, it can precisely measure a planar temperature distribution at a portion or spot of a particular electrode within the fuel cell configured by stacking a plurality of electrodes.

BEST MODES

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a device for measuring a temperature distribution of a fuel cell according to an embodiment of the present invention will be described in detail with reference to the accompanying drawings. Also, as used herein, singular forms "a", "an" and "the" are intended to include the plural forms as well, unless the context clearly indicates otherwise.

Figure 1:
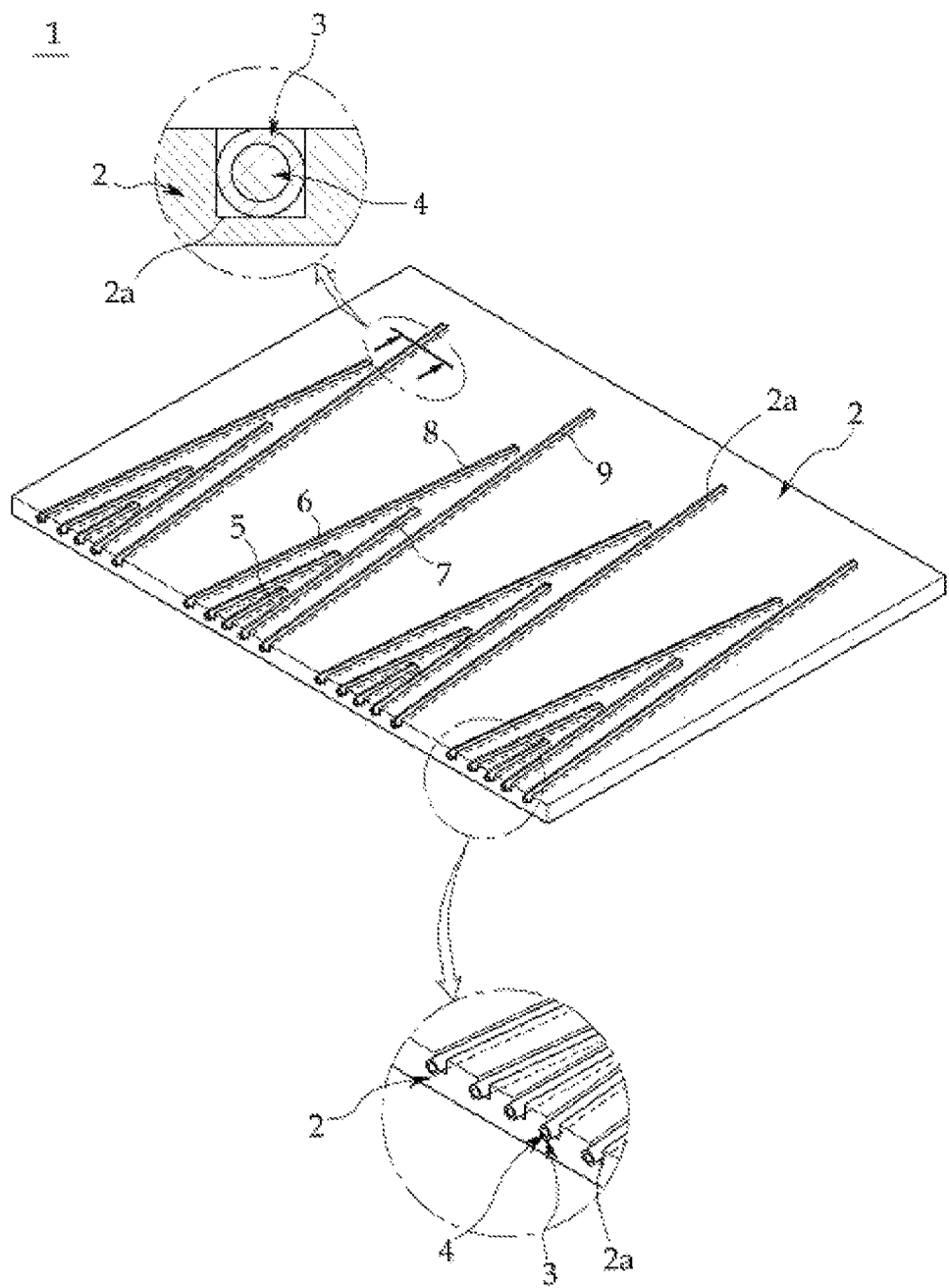
FIG. 1 is a schematic perspective view of a device for measuring a temperature distribution of a fuel cell according to an embodiment of the present invention.
Figure 2:
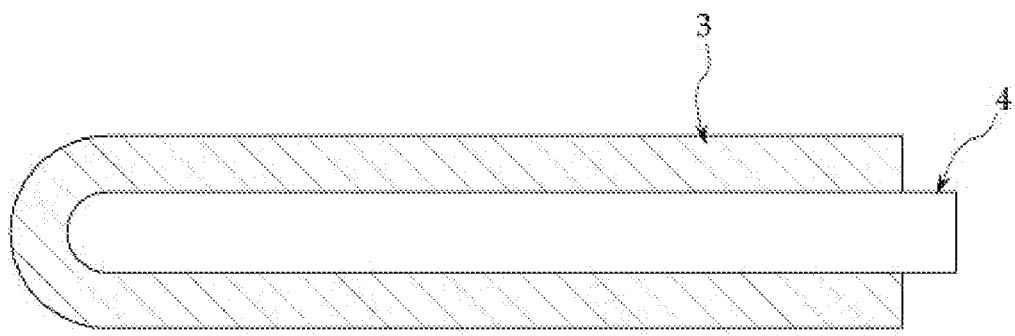
FIG. 2 is a schematic cross-sectional view illustrating a combination of a heat transfer tube applied to the device for measuring a temperature distribution of a fuel cell according to an embodiment of the present invention and a thermocouple inserted therein.

FIG. 1 is a schematic perspective view of a device for measuring a temperature distribution of a fuel cell according to an embodiment of the present invention. FIG. 2 is a schematic cross-sectional view illustrating a combination of a heat transfer tube applied to the device for measuring a temperature distribution of a fuel cell according to an embodiment of the present invention and a thermocouple inserted therein.

As illustrated in FIGS. 1 and 2, a device 1 for measuring a temperature distribution of a fuel cell according to an embodiment of the present invention includes a base member 2 having at least one accommodating portion 2a, a heat transfer tube 3 accommodated in the accommodating portion 2a of the base member 2, and a thermocouple 4 inserted into a hollow of the heat transfer tube 3 and measuring a temperature of heat transmitted through the heat transfer tube 3.

As illustrated, the base member 2 is configured as a flat plate, and the accommodating portion 2a is formed to be recessed from one surface of the flat plate. The flat plate may be made of stainless steel, and the heat transfer tube 3 may be made of a ceramic material. However, the present invention is not limited thereto and, for example, the base member 2 may have a partially curved surface, and the heat transfer tube 3 may be made of a metal or composite materials.

Since the device 1 for measuring a temperature distribution of a fuel cell according to an embodiment of the present invention configured as described above has a flat plate shape, particularly, it may be used to measure a planar temperature distribution of a fuel cell electrode.

Also, since the device 1 for measuring a temperature distribution of a fuel cell has a structure in which the thermocouple 4 is electrically and chemically protected by the heat transfer tube 3 positioned in the accommodating portion 2a of the base member 2, when the thermocouple 4 is inserted into a fuel cell (not shown) the thermocouple 4 cannot be damaged and there is no possibility of corrosion due to electrolyte. Thus, due to the foregoing excellent technical advantages, the device 1 for measuring a temperature distribution of a fuel cell can guarantee a lengthened lifespan of a fuel cell and allows performance of the fuel cell to be excellently maintained.

Hereinafter, a detailed structure of the device 1 for measuring a temperature distribution of a fuel cell according to an embodiment of the present invention will be described.

In an embodiment, the accommodating portion 2a may be at least one groove formed on one surface of the base member 2. In this case, the accommodating portion 2a in the form of a groove may have a depth such that the heat transfer tube 3 positioned in the accommodating portion 2a is disposed to be lower than an upper surface of the flat plate 2. With this configuration, the device 1 for measuring a temperature distribution of a fuel cell according to an embodiment of the present invention can have a smaller size and when the fuel cell is used, collision between the heat transfer tube 3 and a structure of the fuel cell can be prevented.

The groove may have various shapes such as a quadrangular shape, a circular shape, a polygonal shape, and the like. The heat transfer tube 3 generally has a circular shape, and thus, the groove may have a quadrangular shape in order to stably accommodate the heat transfer tube 3 therein. Meanwhile, the accommodating portion 2a of the base member 2 may have a channel-like shape with one side opened. The accommodating portion in the form of a channel may be possibly implemented, but it is difficult to form the accommodating portion in the form of a channel by processing the base member 2.

The base member 2 may be formed to include a plurality of groove groups configured to have a plurality of grooves as a basic unit, respectively. The base member 2 may be made of any material, other than stainless steel, as long as it is free from the possibility of corrosion by electrolyte and has durability against heat having a high temperature anticipated by a fuel cell. The plurality of groove groups are advantageous in that they can more precisely measure a temperature distribution of a particular region of the fuel cell.

For example, as for the plurality of grooves of each groove group, start portions thereof are disposed in the same line in one direction of the flat plate, and end portions thereof are disposed in mutually different positions in the other direction of the flat plate. In detail, start portions of the plurality of grooves of each groove group are the same in a horizontal direction with respect to the base member 2, and end portions thereof have different shapes in a vertical direction. Also, the respective start portions of the plurality of grooves may be disposed to be spaced apart from one another along one side of the base member 2.

The groove structure having such a pattern facilitates installation of the thermocouple 4 in the base member 2, and facilitates measurement of a temperature through the thermocouple 4, and allows a temperature of a particular portion or region in the fuel cell to be precisely measured.

In an embodiment, the respective groove groups may include five grooves 5, 6, 7, 8, and 9. In this case, the five grooves may include a first groove 5 positioned in the center and having a relatively short length, second and third grooves 6 and 7 formed in both sides of the first groove 5 and having a length greater than that of the first groove 5 and having different lengths, and fourth and fifth grooves 8 and 9 formed in both sides of the second and third grooves 6 and 7, having a length greater than those of the second and third grooves 6 and 7 and having different lengths. The five groove structure illustrates a single preferred embodiment, and the present invention is not limited thereto. Namely, fewer or greater amount of grooves may be provided according to a model of a fuel cell.

Also, the second and third grooves 6 and 7 and the fourth and fifth grooves 8 and 9 may be disposed to be sloped at certain angles toward each other. The disposition structure in which the grooves are sloped toward each other allows temperatures distributed in a particular portion or region of the fuel cell to be more minutely measured.

A method for measuring a temperature of a particular portion or region within the fuel cell by using the device 1 for measuring a temperature distribution of a fuel cell according to an embodiment of the present invention configured as described above will be described with reference to FIGS. 1 and 2.

First, in a state in which the base member 2, the heat transfer tube 3, and the thermocouple 4 are prepared, the thermocouple 4 is inserted into the heat transfer tube 3. Thereafter, the assembly of the thermocouple and the heat transfer tube is positioned in the accommodating portion 2a of the base member 2 to complete the device 1 for measuring a temperature distribution of a fuel cell.

Thereafter, the device 1 for measuring a temperature distribution is pushed into a particular portion or region of the interior (or exterior) of a fuel cell (not shown), e.g., one side of an electrode, and a connection terminal of a thermometer (not shown) is subsequently connected to a rear end portion of each thermocouple 4 to measure a temperature of the electrode of the fuel cell. In this case, the base member 2 may be in contact with the particular portion and region of the fuel cell.

Here, the thermocouple 4 is electrically protected by the heat transfer tube 3, preventing leakage of electricity from the fuel cell to the outside, and since the thermocouple 4 is chemically protected, eliminating a possibility that the thermocouple 4 is corroded by electrolyte within the fuel cell. Also, since the heat transfer tube 3 is protected by the base member 2, when the device 1 for measuring a temperature distribution is inserted into the fuel cell, the heat transfer tube 3 is prevented from being physically bought into contact with a counter structure (e.g., an electrode, a separator, a housing, and the like), eliminating damage to the thermocouple.

The device 1 for measuring a temperature distribution of a fuel cell as described above is not limited to the configurations and methods of the foregoing embodiments, but the entirety or a portion of the embodiments may be selectively combined to be configured into various modifications.

INDUSTRIAL APPLICABILITY

The device for measuring a temperature distribution of a fuel cell has industrial applicability.

The invention claimed is:

1. A device for measuring a temperature distribution of a fuel cell, the device comprising:
   a base member configured to contact with at least a portion of a fuel cell, said base member having at least one accommodating portion;
   a heat transfer tube accommodated in the accommodating portion; and
   a thermocouple inserted into a hollow of the heat transfer tube and configured to measure a temperature of heat transmitted through the heat transfer tube, wherein the accommodating portion includes a plurality of groove groups wherein each of the groove groups includes a plurality of grooves.

2. The device of claim 1, wherein the base member is configured as a flat plate, and the accommodating portion is formed to be recessed from one surface of the flat plate.

3. The device of claim 2, wherein the plurality of the grooves of the plurality of groove groups are formed on the one surface of the flat plate.

4. The device of claim 2, wherein the flat plate is made of stainless steel, and the heat transfer tube is made of ceramic.

5. The device of claim 1, wherein start portions of the plurality of grooves of the respective groove groups are disposed in the same line in one direction with respect to the flat plate, and end portions thereof are disposed in different positions in an other direction.

6. The device of claim 5, wherein the respective start portions of the plurality of grooves are disposed to be spaced apart from one another along one side of the base member.

7. The device of claim 5, wherein the respective groove groups include five grooves, and the five grooves include a first groove positioned in the center, second and third grooves formed in both sides of the first groove and having a length greater than that of the first groove and having different lengths, and fourth and fifth grooves formed in both sides of the second and third grooves, having a length greater than those of the second and third grooves and having different lengths.

8. The device of claim 7, wherein the second and third grooves and the fourth and fifth grooves are disposed to be sloped at certain angles toward each other.

9. The device of claim 1, wherein the plurality of grooves of at least one of the plurality of groove groups includes a pair of grooves sloped toward each other.

10. The device of claim 9, wherein measuring points of the thermocouple in the pair of grooves are disposed in different positions along a direction of an axis between the pair of grooves.

\* \* \* \* \*